United States Patent [19]

Lesty et al.

[11] Patent Number: 4,756,887
[45] Date of Patent: Jul. 12, 1988

[54] PROCESS OF HEAP LEACHING

[75] Inventors: Serge Lesty; Robert Surjous, both of Langogne, France

[73] Assignee: Compagnie Francaise de Mokta, Paris, France

[21] Appl. No.: 626,724

[22] Filed: Jul. 2, 1984

[30] Foreign Application Priority Data

Jun. 30, 1983 [FR] France .................. 83 10953

[51] Int. Cl.⁴ .................. C01G 43/00; B01F 1/00
[52] U.S. Cl. .................. 427/20; 299/4; 299/5; 423/3; 423/658.5
[58] Field of Search .......... 423/17, 18, 20, 3, 658.5; 299/4, 5

[56] References Cited

U.S. PATENT DOCUMENTS

| | | | |
|---|---|---|---|
| 4,071,278 | 1/1978 | Carpenter et al. | 423/658.5 |
| 4,080,419 | 3/1978 | Engelmann | 423/32 |
| 4,301,121 | 11/1981 | Kohorn | 423/658.5 |
| 4,318,892 | 3/1982 | Kohorn | 423/658.5 |

OTHER PUBLICATIONS

Merritt, "The Extractive Metallurgy of Uranium", pp. 108-119, Colorado School of Mines Research Inst., (1971).

Primary Examiner—Edward A. Miller
Attorney, Agent, or Firm—Fleit, Jacobson, Cohn & Price

[57] ABSTRACT

The present invention relates to a new process of heap leaching and comprises the following steps:
(a) preparing the ground to receive the heap;
(b) forming the heap;
(c) sinking injection wells into the heap;
(d) injecting the leaching solution by means of injection wells; and
(e) recovering the leaching solution at the base of the heap, or by pumping from wells neighboring those used for injection.

14 Claims, 6 Drawing Sheets

PROCESS OF HEAP LEACHING

The object of the present invention is a new process of heap leaching. It more particularly concerns a new process of heap leaching of lean minerals.

During the mining of deposits of materials requiring a metallurgical treatment, deposits are frequently encountered which are characterized by a small tonnage, not justifying the construction of a treatment plant, or by contents which are too low to permit this ore to by transported to an existing plant.

Moreover, in the case of substantial deposits which justify the construction of a plant, ores often have to be discarded as barren or in the form of tailings when their content of beneficiatable materials is too low for their treatment in a conventional plant to be contemplated. This is particularly clear in the case of the opencast method of mining, which is more and more commonly used at present and which leads to the extraction of a very considerable quantity of inevitable gangue. This is likewise true in the case of underground mining by bulk cutting, in which the weight of gangue is likewise high.

This is why methods of heap leaching, permitting products to be treated which cannot be beneficiated in a conventional plant, have appeared for several decades. Nevertheless, this very primitive method, even though it enables the overall recovery balance of beneficiatable materials from a deposit to be improved, does not permit appreciable modification of the mining economics of a substantial deposit, due to its generally mediocre yield (50–70%) and to the very numerous disadvantages which it moreover entails, particularly as regards damage to sites and pollution of water. It is also unsuited for beneficiation of small deposits.

It should be noted that the application of these existing methods to the recovery of uranium poses particular problems, given the very strict constraints relating on the one hand to the radioactivity of the wastes (uranium and radium in water) and on the other hand to the radioactivity of the dumps proper (emission of radiation). These problems are aggravated by the very long-term risk which these pollutions present.

For this reason, one of the objects of the present invention, which is the result of research aided by the European Economic Community, is to provide a process of lixiviation in dumps which enables yields to be achieved close to those obtained in chemical reactors, and preferably yields at least equal to 90% of the yields obtained in chemical reactors under similar conditions.

Another object of the present invention is to provide a process of heap leaching which protects the surroundings from the various radiations emitted by the ores in heaps, in the case of application to radioactive ores.

Another object is to provide a process which enables sites to be rehabilitated while they are being exploited.

Another object is to provide a process of heap leaching which does not pollute the surface water in the neighborhood of the heap to be leached and which is not influenced by atmospheric precipitation.

Another object of the present invention is to render improbable the pollution of subterranean waters by seepage of leaching solutions through the soil.

Finally, another object is to permit heap leaching at a temperature different from the ambient temperature, without excessive heat losses.

These objects, as well as others which will appear below, are achieved by means of the process according to the invention, which is characterized by the fact that it comprises the following steps:

(a) the ground which is to receive the heap is prepared;
(b) the heap is formed;
(c) injection wells are sunk into the heap;
(d) the leaching solution is injected by means of the injection wells;
(e) the leaching solution is recovered, for example, from the base of the heap; or by pumping from wells neighboring those used for injection
(f) the heap to be leached is optionally protected; this protection can advantageously be placed in position after step (c).

Steps (a) and (b), although they are less critical than the following steps, however, play an important part in the achievement of the stated objects.

The choice of ground suitable for receiving the heaps is in particular very important; it should be made as a function of the following main criteria. It is very desirable that the ground is situated in a zone which:

is mechanically stable: the absence of large irregularities can be verified by geophysical surveys (for example, electrical or electromagnetic methods) or by geological surveys;

has a natural slope comprised between 1 and 5%, preferably between 2 and 4%, the low part of this zone not being subject to flooding.

When possible, the ground thus selected is advantageously stripped, the topsoil being placed in reserve for possible complementary preparation work which is set out below. A system of drainage, for example, by perforated plastic pipes, is advantageously installed. The pipes are then preferably connected to the base of a general collector which can be provided with a sampling device for analysis of the water collected.

This ground, after being drained, should be sealed in a practical manner by means of a material preferably having the following particle size characteristics:
100% less than 250 millimeters;
80% between 100 and 160 millimeters; and
20% between 2 and 4 millimeters
and distributed generally in two layers, compacted in succession by means of a compacting apparatus of suitable dimensions.

In all cases, this work is to be carried out according to the principles of the art, with consultation with a specialized laboratory which will define, as a function of the material, the thickness of the layers, the type of apparatus, and the number of passes.

The impermeability of this base layer can be improved by putting in place on the compacted ground a sheet, which can form a wall for possible deformations, of an impermeable product such as that sold under the commercial name BIDIM, 2 millimeters thick, sealed by spraying hot bitumen which is specially formulated to give a certain flexibility to the resulting product, and which enables it to withstand possible deformations.

A layer of sand (particle size distribution comprised between 0.2 and 2 millimeters), about 0.20 meter thick, is placed in position on this felt, and is covered by a drainage layer (100% comprised between 20 and 300 millimeters), 0.50 meters thick. When the ground has thus been prepared, the putting of the heap into position can then proceed.

To permit practical surface operations to be carried out and to limit the effects of erosion, the greatest slope of the heap with respect to the horizontal should be comprised between 10 and 20%, preferably in the neighborhood of 15% (±2.5%). These values constitute an excellent compromise between the possibility of treatment and too great a surface occupied by the heap. They furthermore correspond to an acceptable value for the traffic of ore haulage units.

Preferably, this placing of the heap in position is carried out such that there are no superposed strata which cause anisotropy with respect to circulation of the solutions. From this surface relief, terraces are then bulldozed which follow the contour lines and are cut into the general slope of the heap, planned to be 15%. The width of these terraces and the difference in level between successive terraces depends on the spacing of the injection borings. This spacing is linked to the permeability of the material and can be determined on the spot from a pilot hole by geophysical methods (for example, a seismic method, enabling the shape of the saturated zones to be defined).

Advantageously, a revetment is constituted on the external edge of the terrace such that each terrace constitutes a kind of basin which is elongated along a contour line.

Injection wells are then drilled with a diameter about 25% greater than the diameter of the tubings; these wells are vertical (tolerance of about 5% with respect to the vertical) and are implanted along the axis of each terrace on a grid which is advantageously defined by the results of a seismic survey. The optimum depth of these wells is likewise given by the geophysical campaign. It should be such that the base layer is not perforated.

These wells are preferably tubed by means of perforated plastic tubes, the tubing heads being advantageously provided with a cross-shaped connection which permits on the one hand the placing in position of an unperforated tube enabling the covering layers to be passed through, and on the other hand the interconnection of wells of the same level by means of a horizontal perforated tube, preferably having the same diameter as that used for the vertical tubing.

These horizontal tubes are advantageously disposed substantially along the axis of the terraces and buried in a drainage layer composed of materials of coarse particle size distribution (100% comprised between 20 and 300 millimeters) occupying the volume comprised between the base of the terrace and the general profile of the heap. This drainage layer acts as an expansion chamber for the leaching solution injection system.

It should be noted that this method of placing the product to be leached in contact with the leaching solution represents one of the most important characteristics of this new technique. Conducting the solutions to different levels of the dump in fact enables the phenomena of clogging observed in the conventional process of circulation of the solutions "by descent" to be avoided, and the existence of an expansion chamber furthermore enables solutions under pressure, if necessary, to be conducted into the injection holes.

An impermeable layer, formed of compacted materials and intended to prevent, on the one hand, dilution of the leaching solutions by runoff water and atmospheric precipitation and, on the other hand, the leaching solutions leaving the heap and polluting the surface water. This layer can be formed according to the same procedure as that set out for the preparation of the heap.

Once this compacted layer has been formed, it ensures that the heap is enclosed in what could be termed an earthenware pot. Nevertheless, this kind of layer has in general a low resistance to erosion by runoff water.

For this reason, this impermeable layer is covered with a drainage layer, which can likewise be made with materials found during mining, and for the choice of which a specific study should also be requested from a specialized laboratory. The thickness of this layer is advantageously comprised between about 0.60 meter and about one meter, i.e., on the average 0.80 meter, to make possible a good development of the roots of the vegetation which will be planted there.

This drainage layer is itself covered with a layer of topsoil, 0.10 to 0.50 meter thick, corresponding to the topsoil which was initially stored during the initial stripping.

The compacted layer, the drainage layer and the topsoil are positioned around the unperforated vertical tubes giving access to the injection wells.

Vegetation is planted to enable the topsoil to be stabilized, so as to avoid its being entrained by the runoff water. This vegetation is well known to the specialists of waters and forests and is chosen from the group of trees and shrubs with creeping roots. These trees and shrubs are obviously chosen from the plant communities suitable for the region.

If necessary, the surface impermeability of the system can be reinforced by putting in place a layer of polyester felt made impermeable with bitumen, of the same type as that at the base of the heap. To avoid sliding of the ground on this smooth surface, the basins formed by the terraces then have to be filled with a drainage layer of uniform thickness (one meter), the layer of felt being placed on top of this drainage layer. The surface relief with 15% slope is then reconstituted by means of a drainage layer above this impermeable film, the upper coverings being in conformity with the previous arrangement.

The heap thus formed constitutes a huge reactor, sealed from the environment, giving the double advantage of not polluting the latter and that the latter does not disturb the leach and contaminate the leach with undesirable elements, thus permitting a leaching in a heap, for example, in an equatorial zone without trouble from precipitation.

The leaching solution can be passed to a distribution point, designed to resist weather and corrosion, situated at the summit of the heap. Supply of the injection holes can be effected very simply by movable pipes connected to the said distribution point.

The throughput of the solutions can be controlled by valves such that the injection holes are at least saturated, the level of liquids in the wells in service being detected by piezometric measurements.

The simplest and most general case consists of recovering the liquors at the base of the heap at the level of the sealing film. The recovery basin for these solutions is set up such that the liquors can flow there by gravity.

The impermeable zone situated at the base of the heap can advantageously be designed such that there are the greatest possible number of recovery zones for the heap solutions, the zones being mutually independent and each permitting a volume of ore to be defined corresponding to one leach module. The simplest design consists of making the base surface undulating, the hollows of each wave forming the subject of an individual recovery operation.

If necessary, a part of the leaching solution can be recovered by pumping out wells adjacent to the wells in service, but for safety reasons the base sealing device cannot be simplified.

The exploitation of heaps in autonomous modules of minimum dimensions has the following advantages:

possibility of very speedily starting production without waiting for the completion of formation of the heap;

very great flexibility in chemical operation, with the possibility of internal recirculations, circulations in series, ripening stages, etc.; and spreading out the costs of site preparation and of restoring the state of the ground.

This method, which has been described for the treatment of uranium ores, can be utilized for the leach of numerous other minerals in heaps. The injection wells can in part be equipped with exhaust fans in the case of considerable release of gases. It should further be noted that the envelope about two meters thick which caps the heap permits good thermal insulation of this heap and consequently the hot treatment of products whatever the external climatic conditions.

BRIEF DESCRIPTION OF THE DRAWINGS

FIG. 3 shows a general sectional view of the leaching heap. There can be seen the leaching solution injection pipes 2, drainage layers of barren material 9 placed on the terraces 8, upper compacted barren material 10, a layer of topsoil placed on a drainage layer 11, channels for recovery of runoff water 12 and a channel for recovery of leaching solution 13 placed at the end of the active drains 4, the bituminized "Bidim" 5, the safety drains 7, and the two underlayers of compacted barren material 6, 6'. In FIG. 3 there also appears the substratum 14, the line of long dashes representing the horizontal profile. FIG. 3 takes account of the slopes of the heap and of the ground before the formation of the heap.

In FIGS. 4 and 5 can be seen the topsoil 11, a drainage layer 15, two underlayers of compacted barren material 10, each of 40 centimeters, the terraces 8 with revetments 16, leaching solution injection pipes 2 and the ore 1.

FIG. 7A shows the laboratory system of Example 1. An ore-filled column 22 400 millimeters in diameter and 3.5 meters in height, with portholes 23, receives a leaching solution from the duct 24. The level of the solution is kept constant by means of an overflow 25. The solution is recovered in a 200-liter reservoir 26. A pump 27 enables the unexhausted leaching solution, or that from the overflow, to be recycled at 24.

In FIG. 7B, the same apparatus is concerned; the elements having the same functions are given the same reference numbers, and the leaching solution injection pipe 2 can be seen in it.

Figure 8:
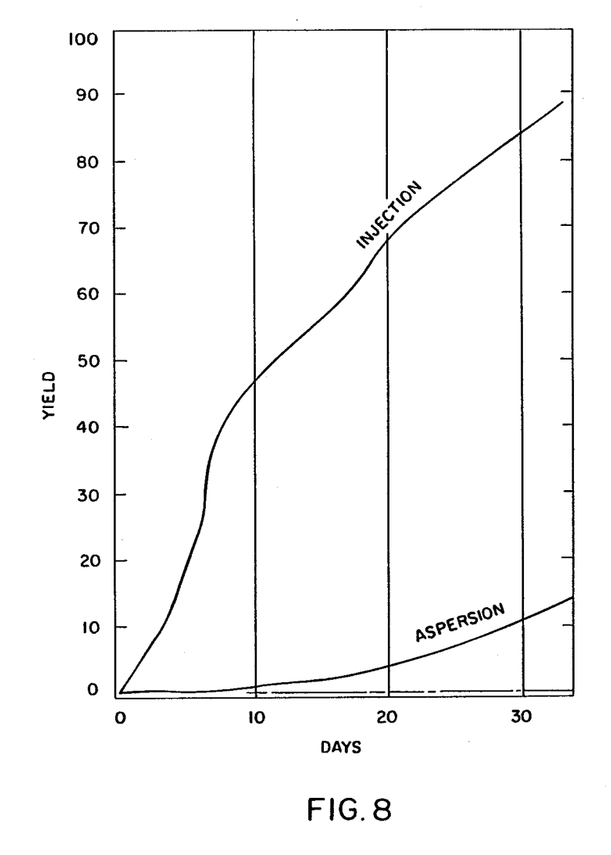
Figure 9:
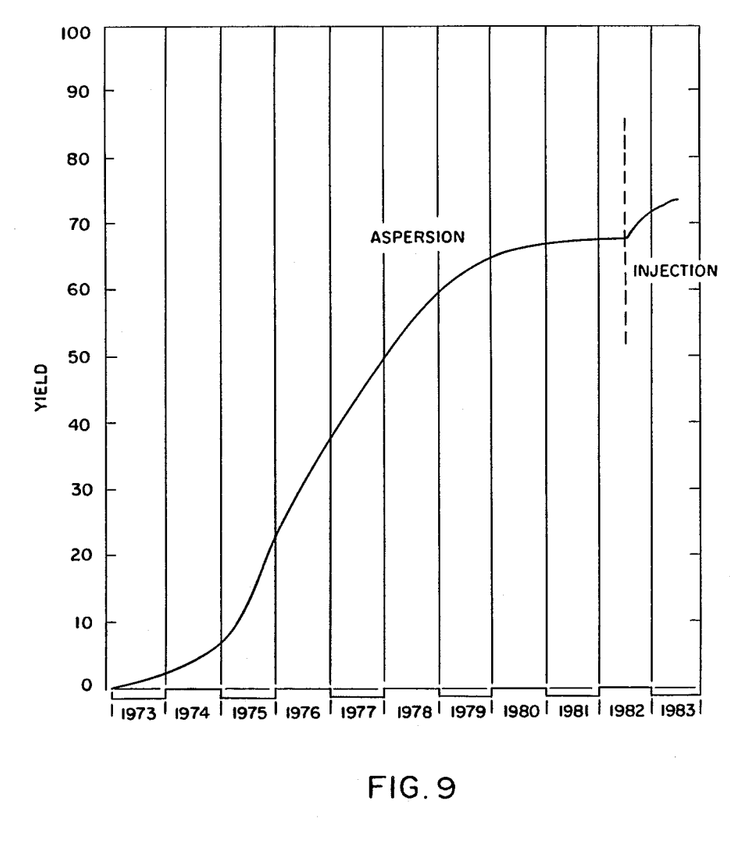

The following non-limitative examples and FIGS. 8–9 have the purpose of enabling those skilled in the art to easily determine the operating conditions which it is suitable to utilize in each particular case.

EXAMPLE 1

Trials on the laboratory scale

These trials demonstrate the advantages of the process according to the present invention:

to determine the suitability of an ore for heap leaching, from a sample of about two metric tons, supposed to be representative of the deposit concerned;

to characterize this ore by parameters which enable the installation to be defined:

rate of percolation of the solutions through the bed of ore;

composition of the attacking liquor; and yield as a function of time.

Procedure

Tests on a small agitated laboratory reactor, enabling the behavior in a conventional plant of the ore under consideration to be defined, and in particular enabling the optimum uranium content of the residues and the consumption of reactants to be known.

The tests suitable for heap leaching are carried out in the following manner:

Construction of two PVC columns, 3.50 meters high and 400 mm in diameter, each comprising a filter bed at the base and a solution recovery basin.

Transparent windows enable the peripheral paths of the liquors to be followed.

The two columns are filled with ore of 0–200 particle size distribution, up to 20 centimeters from the top. One of the columns is for irrigation "by descent", the distribution of solutions at the head being by means of a felt. Control of the irrigation is by means of an overflow passing the excess of solution into the bottom basin, equipped with a pump (see FIG. 7A).

The other column is equipped with a central injection pipe (perforated 20 millimeter PVC tube). The control system is identical to the preceding one, with the pump positively feeding the injection tube.

The addition of appropriate dyes enables the impregnation of the zones to be followed better, if necessary.

The various tests carried out showed that this apparatus permits the characteristic parameters of the static leach, with or without injection, to be determined with good precision:

rate of percolation of the solutions;
permissible irrigation throughput; and
yield.

Results obtained on the ore of a small granite deposit of low content:

Trials in a conventional reactor:

| Trial | Dry Weight (t) | Content (ppm) | Content residues | Yield | Acid added g/kg | Free acid at end of attack | Other obsns. |
| --- | --- | --- | --- | --- | --- | --- | --- |
| 1 | 189.2 | 609 | 30 | 95 | 84.6 | 50.5 | 51.3 |
| 2 | 181.4 | 543 | 27 | 95 | 55.1 | 44.6 | 41.3 |
| 3 | 187.4 | 555 | 31 | 94 | 26.7 | 11 | 19.2 |

Figure 7A:
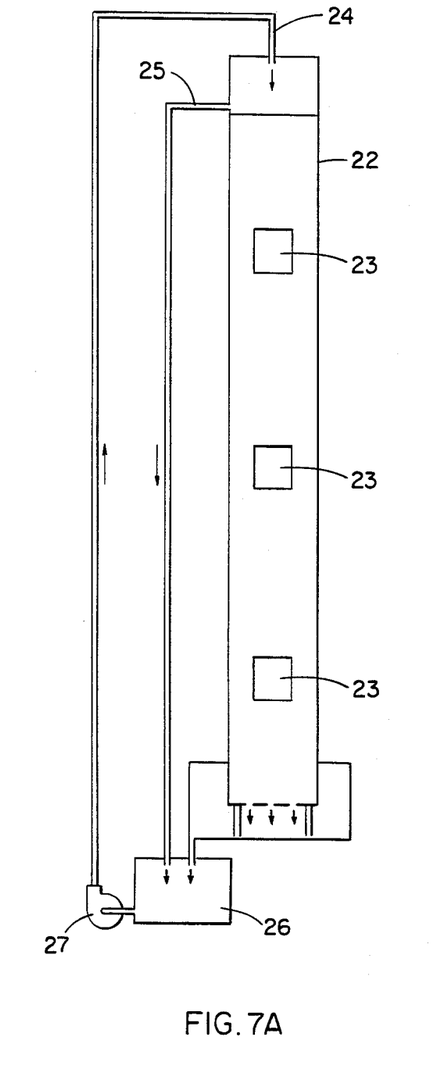
Figure 7B:
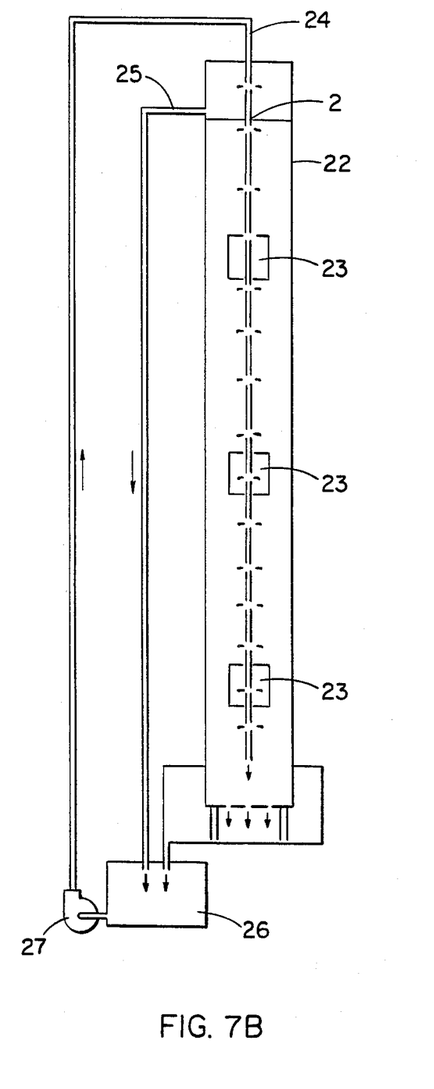

Trials of static leaching (FIG. 7):

|  | Trial by percolation | Trial by injection |
| --- | --- | --- |
| Rate of percolation | $0.08 \times 10^{-5}$ m/s | $2.1 \times 10^{-5}$ m/s |
| Permissible irrigation throughput | 0.8 m$^3$/t | 7.74 m$^3$/t |
| Yield at end of 33 days | 12% | 86% |

The injection trial was voluntarily stopped at the end of 33 days to permit checking (sampling).

The percolation trial was prolonged to 74 days due to the low yield at 33 days (see FIG. 8).

EXAMPLE 2

Results obtained on an ore dump of 530,000 metric tons initially treated by static "percolation" leaching and continued by static "injection" leaching This is the case of a considerable deposit exploited by opencast and equipped with a conventional plant. The heap concerned is located near Langogne, France, and is composed of marginal ores, gangue from the opencast pit. It comprises 531,500 metric tons at 380 ppm, say 202,000 kg of uranium.

This heap occupies a surface of about 20,000 m$^2$, and the mean height is 15.6 meters. The flanks are sloped at about 40 degrees to the horizontal.

The treatment by percolation was continued without interruption from 1973 to 1981 with solutions characterized by a free acidity of the order of 10 to 15 grams per liter.

The attached curve shows that the treatment could be considered as ended at the end of 1981, the yield being 69% and the asymptote appearing to be located at 70%.

Injection holes were sunk on a 10×10 grid on the whole of the heap in spring 1982. The treatment by injection commenced in June 1982.

A clear resumption of production of the heap can be observed, the yield/time curve giving hope of a new asymptote which should be comprised between 95 and 90% (see FIG. 9).

On June 1, 1983, the yield reached 75%; the last results do not seem to show a fall-off of production of the heap.

EXAMPLE 3

Application of the "injection" method to a heap of marginal ore of 1.5 million metric tons at 195 ppm, gangue from an opencast mine The same deposit near Langogne, France, is concerned as in the preceding example; this new heap was constituted from 1976 as a replacement for heap No. 1, but was only put into production, directly by the "injection" method, in the winter of 1982. The beginning of exploitation is too recent for results to be obtained from it which are significant from the chemical point of view; however, the technical data on the preparation of the heap are of interest as a practical illustration of the method applied to a large heap.

Site chosen: waterless head of thalweg with slopes of the order of 5%, corresponding to a stable granitic base (resistive zone in electrical geophysics).

Preparation of the ground:

drainage placed in position adjacent the bedrock;

ground compacted; and drainage layer.

Formation of the heap: the heap is in the form of a dome with slopes uniformly of 15%, the summit being 30 meters above the base zone.

Figure 1:
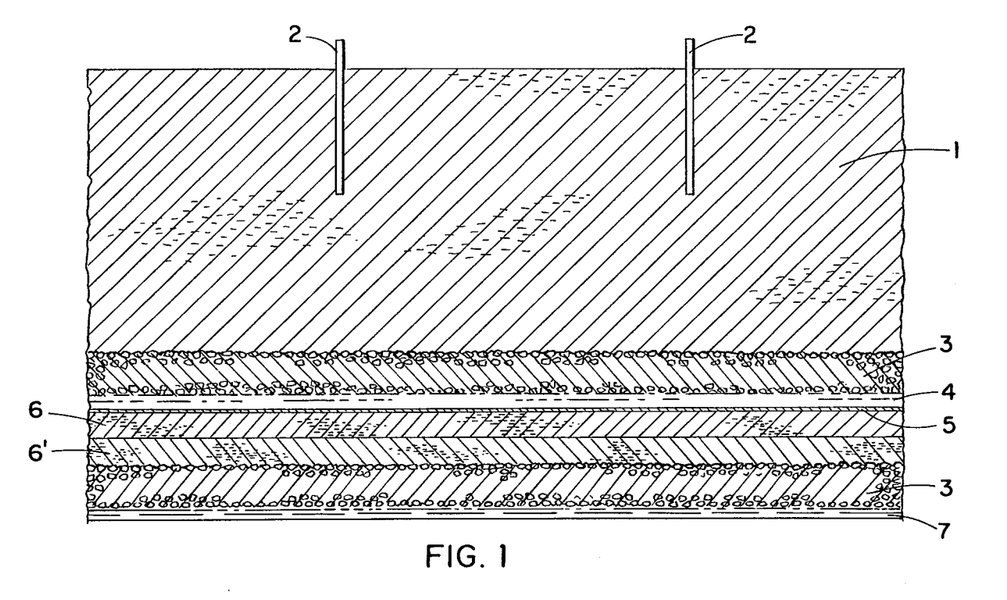
FIG. 1 shows a section at the base of the heap in which the ore 1 is fed by leaching solution injection pipes 2 and rests on a drainage layer 3 which is itself over an active drain 4 placed on a layer of bituminized "Bidim" 5. The "Bidim" rests on two layers of compacted barren material 6 and 6', each of 40 centimeters. A drainage layer 3' as well as a safety drainage layer 7 enable the ground water to be allowed to run off.
Figure 2:
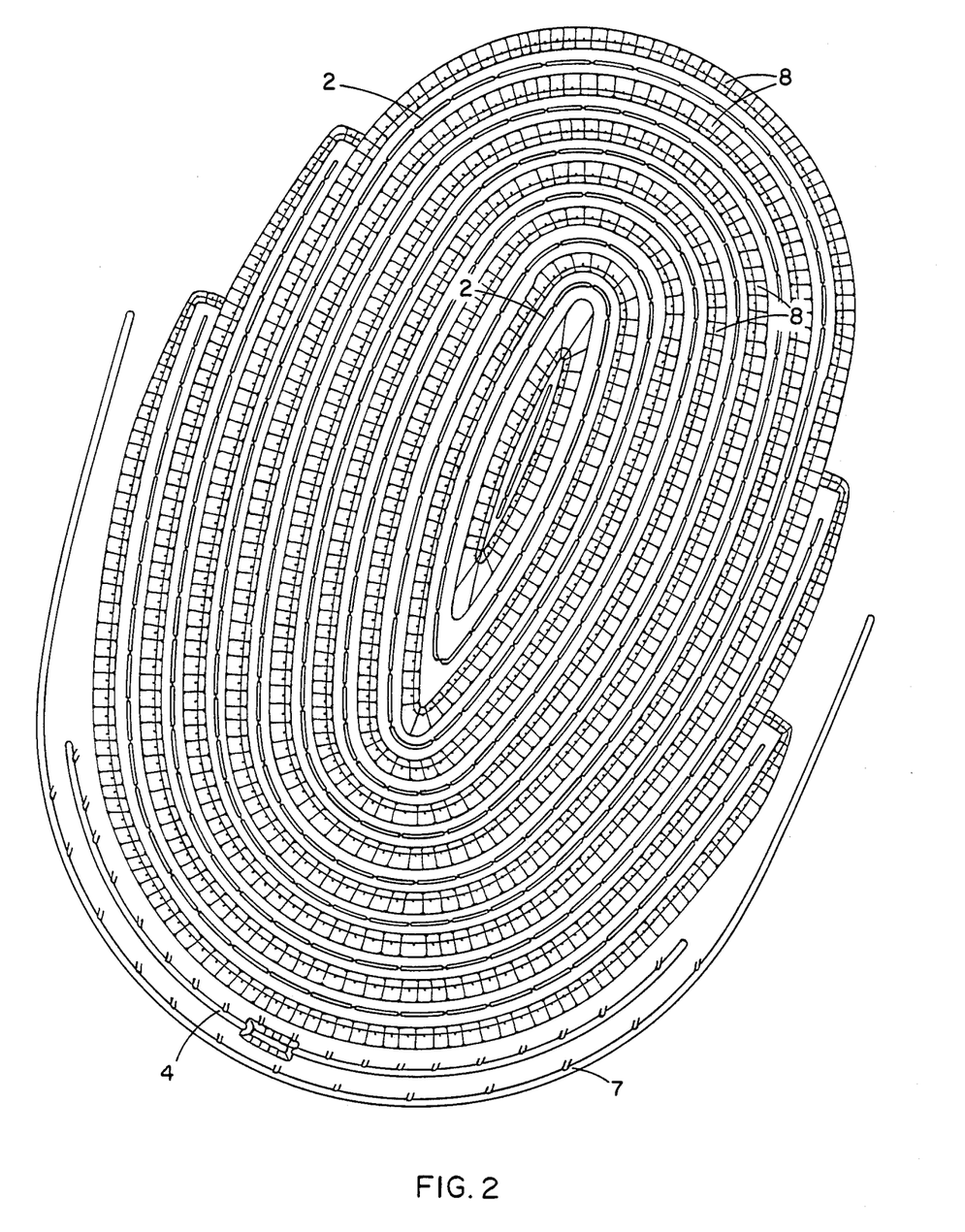
FIG. 2 shows a top view of a leaching heap before the terraces are covered. In this diagram there are seen the leaching solution injection pipes 2, the safety drains 7, the active drains 4, and also the terraces 8.
Figure 3:
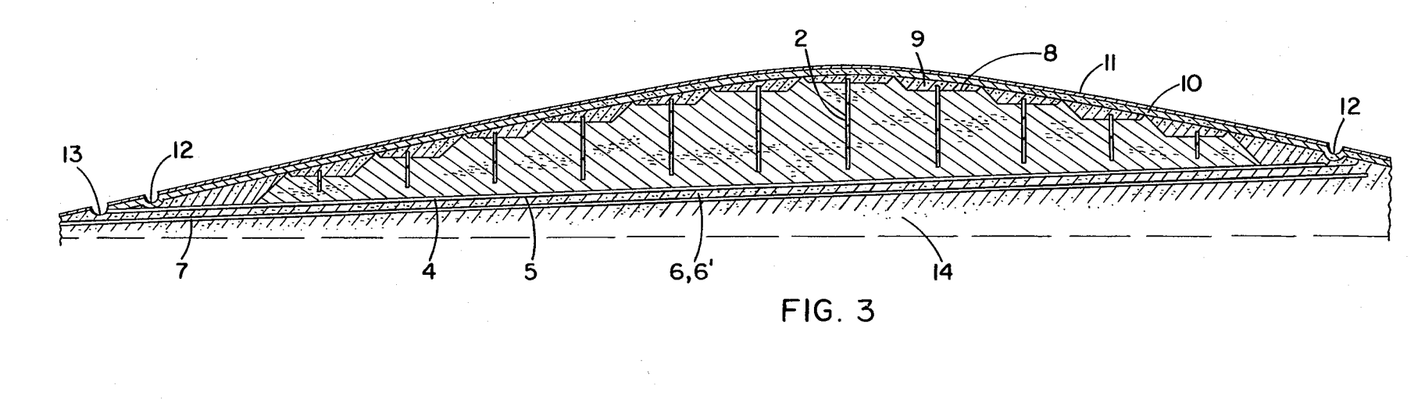
Figure 4:
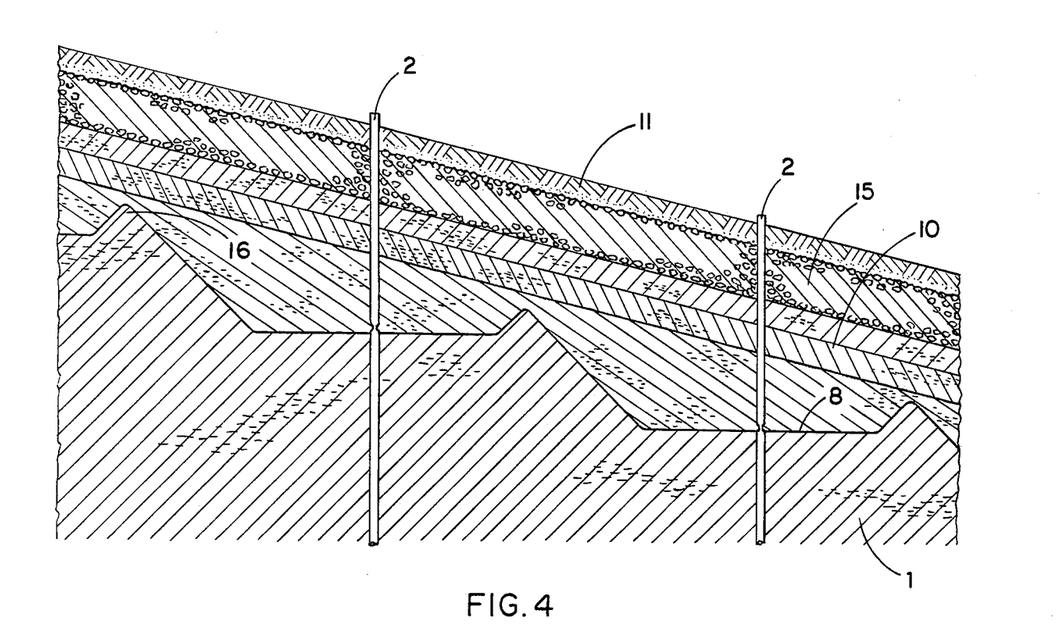
FIGS. 4 and 5 show a transverse section through the terraces and also a longitudinal section, respectively.
Figure 5:
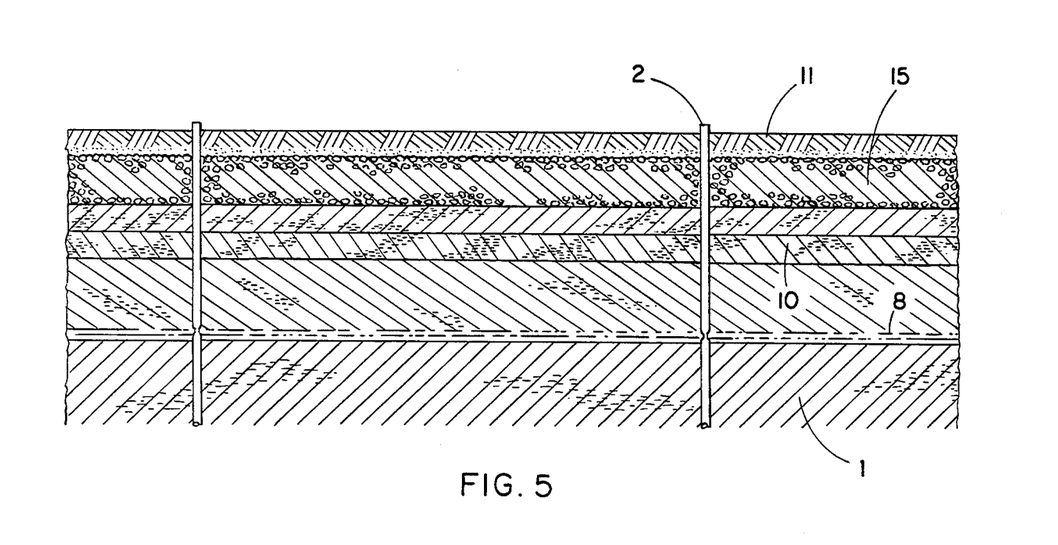

The various investigations resulted in fixing a 10 m × 10 m drilling grid, leading to the creation of a series of terraces at different levels at steps of 1.5 m, the width of the terraces being of the order of 7 meters (FIG. 5).

The diameter of the boreholes is 140 millimeters, and of the perforated tubing 110 millimeters. These boreholes were sunk to about 5 meters of the base. The system of horizontal piping and crosses is in conformity with the preceding theoretical description.

This piping is buried in the drainage layer (see FIG. 5) of about 1.75 m mean thickness.

Protection of the heap:

The heap is protected by the conventional assembly described previously and comprising a compacted sealing layer of 0.80 m, a drainage layer of one meter, and a 0.30 m topsoil layer.

The injection is carried out well by well by means of a movable pipe connecting the central distribution point to the borehole concerned.

The throughput is of the order of 55 m$^3$/hour.

Recovery takes place in a basin situated at the foot of the heap.

The present production is of the order of 4,000 kg of uranium metal per month in the form of a solution of 100 mg/l passed into an ion exchange resin.

EXAMPLE 4

Figure 6:
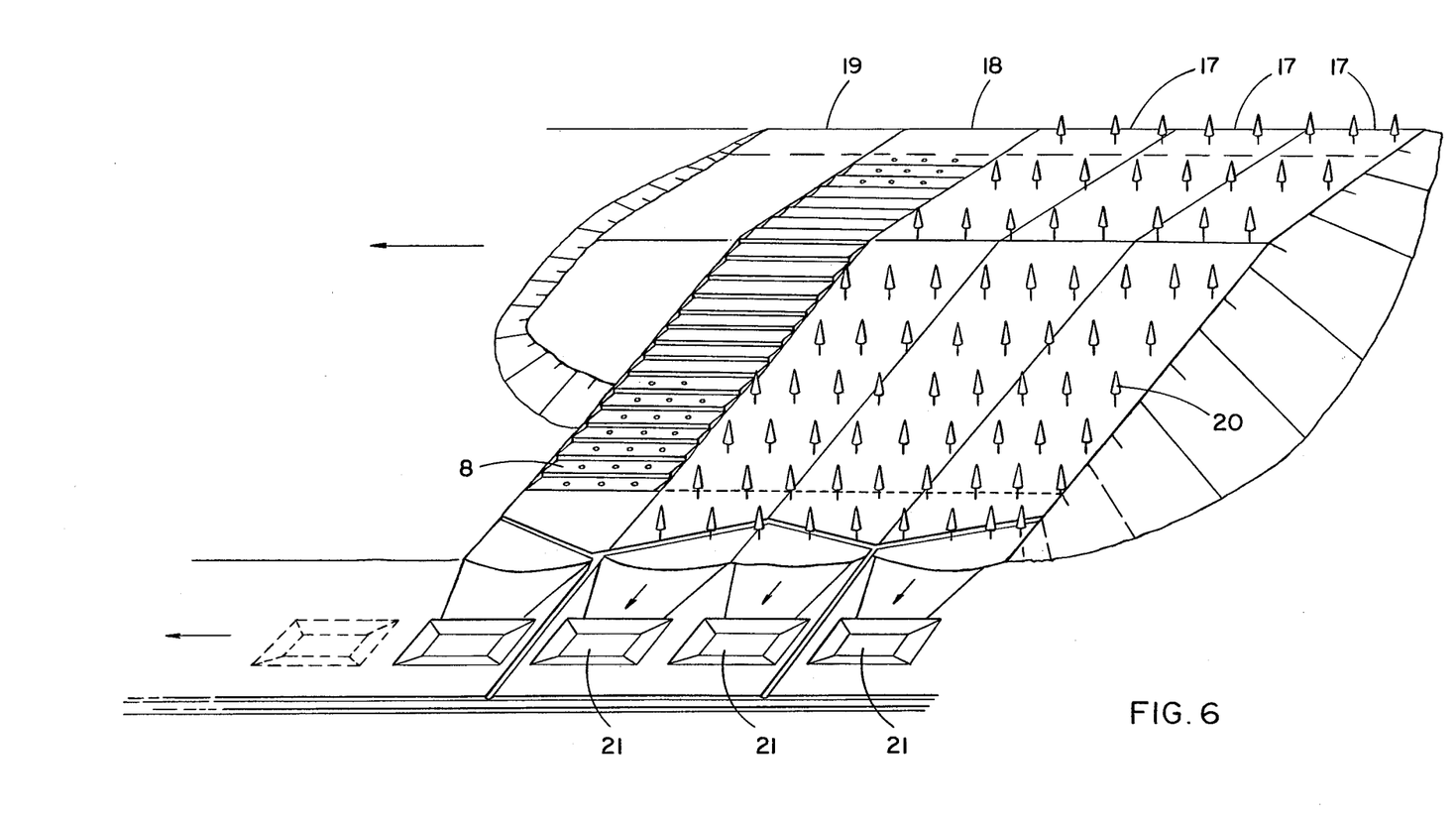
FIG. 6 shows a general view of a modular leach in which are seen three operating modules 17, a module being prepared 18, and a module being placed in position 19. The modules are placed in position from right to left in this figure. The vegetation 20 on the operating modules and the terraces 8 in the module being prepared will be noticed. Basins 21 collect the solutions coming from the channels 13 which enable the leaching solutions to be collected.

Application of the "injection" method to a small isolated deposit, exploited by opencast mining (FIG. 6)

This concerns only a project, but one which shows well the advantages of this method in relation to the conventional methods.

This project concerns a tonnage of 1,700,000 metric tons at 400 ppm, i.e., 678,000 kilograms of uranium metal (100 ppm cutoff).

Economic calculations show that the treatment of this ore in the closest conventional plant would require a cutoff level of 1,000 ppm, which would only permit 141,000 metric tons of ore at 1,760 ppm to be beneficiated, i.e., 247,000 kilograms of uranium.

The type of opencast working remaining the same, the proportion of overburden would go from 1.35/1 to 27.4/1 and the ratio tonnage handled/recoverable kilograms of uranium from 5.9 to 16.2.

Only the process of static leaching can permit possible exploitation of this very marginal deposit.

The installation envisaged consists of a system of autonomous modules of 120,000 metric tons unit capacity.

Site chosen:

Side of a cirque sloping at about 5% on a stable granitic base, with presence of a natural threshold permitting easy detection of possible losses. This site was chosen for its exceptional characteristics, which make up for the distance (6 km) from the deposit proper.

Preparation of the ground:

Set of operations described in the preceding theoretical study and comprising:

stripping of the topsoil;
drainage into the sands;
placing in position a compacted layer;
placing in position of the sheet of bituminized "Bidim"; and
placing in position the protective layer and the drainage layer.

It should be noted that this preparation can be carried out module by module and thus forms part of the cost of exploitation. Each module of 120,000 metric tons corresponds to an undulation of the prepared ground.

Formation of the heap:

The general slope of the heap is 15%, with the exception of the working side, the slope of which corresponds to the angle of repose.

Terraces are formed perpendicular to the undulation.

The characteristics of the module are as follows:
length: 250 meters
width: 25 meters
maximum height: 20 meters
minimum height: 5 meters Protection of the heap:

The system is in conformity with the general arrangement described previously, and comprises:

a compacted layer;
a drainage layer; and
a layer of topsoil.

It should be noted that this covering is formed module by module but that only module No. n−1 can be prepared superficially, module n being in a waiting state after the ore is placed in position and module n+1 being in preparation.

Sinking of the wells:
Grid adopted: 10 m×10 m
Borehole diameter: 140
Tubing diameter: 110.

The holes are sunk to 5 meters from the bottom.

Injection:

There is a distribution point for each module, situated at the summit of each module, with the solutions conducted by movable piping connecting the distribution point to the active boreholes.

Recovery of the solutions:

Each module has a solution recovery basin equipped with a pump and situated at a level lower than the base of the heap.

The different modules are kept in activity during the duration of the exploitation, thus permitting an optimum recovery of the contained metal.

The anticipated production is of the order of a hundred metric tons of uranium metal per year, the expected yield being of the order of 80%.

We claim:

1. A process of heap leaching, comprising the following steps:
   (a) preparing the ground intended to receive a heap;
   (b) forming the heap including ore covered by a layer of compacted materials and an outer layer of topsoil;
   (c) sinking injection wells into the heap, said wells being formed by pipes having perforations over a substantial portion of their length;
   (d) injecting the leaching solution by means of the injection wells; and
   (e) recovering the loaded leaching solution at the base of the heap or by pumping from wells adjacent to the injection wells.

2. A process according to claim 1, further comprising forming the heap on ground having a slope of between 1 and 5% with respect to the horizontal.

3. A process according to claim 2, wherein the slope is between 2 and 4%.

4. A process according to claim 1, wherein the layer of compacted materials has an underlayer of felt sealed with a bitumen.

5. A process according to claim 1, wherein the sides of the heap have a slope of between 10 and 20% with respect to the horizontal.

6. A process according to claim 1, wherein said compacted layer is covered by a layer of coarse sand and said layer of coarse sand is covered by said layer of topsoil.

7. A process according to claim 6, wherein the said layer of coarse sand is comprised between sixty centimeters and one meter.

8. A process according to claim 1, wherein vegetation is planted on the layer of topsoil.

9. A process according to claim 8, wherein the vegetation is selected from the group consisting of trees and shrubs with creeping roots.

10. A process according to claim 1, wherein a network of tubes connects together all the wells of the same level.

11. A process according to claim 1, wherein the base of the heap is drained so as to recover the leaching solutions at the base of the heap.

12. A process according to claim 1, wherein the dump is leached in modules.

13. A process according to claim 1, wherein the leaching solution is recovered by an immersed pump placed in wells which are not being used for injection and are situated close to injection wells.

14. A process according to claim 1, wherein the leaching solution is acidic and the loaded leaching solution contains uranium.

* * * * *